United States Patent [19]

Quach et al.

[11] Patent Number: 5,124,047

[45] Date of Patent: Jun. 23, 1992

[54] METHOD OF INHIBITING SCALE DEPOSITS

[75] Inventors: Loc Quach, Columbia, Md.; Lai-Duien G. Fan, Palatine, Ill.

[73] Assignee: W. R. Grace & Co.-Conn., New York, N.Y.

[21] Appl. No.: 607,977

[22] Filed: Nov. 1, 1990

[51] Int. Cl.$^5$ .................................................. C02F 5/14
[52] U.S. Cl. ...................................... 210/699; 210/700; 210/701
[58] Field of Search ........................... 210/699, 700, 701

[56] References Cited

U.S. PATENT DOCUMENTS

| | | | |
|---|---|---|---|
| 3,687,779 | 8/1972 | Rapko | 210/699 |
| 3,719,756 | 3/1973 | Francis | 424/204 |
| 4,017,564 | 4/1977 | Arend et al. | 260/969 |
| 4,048,066 | 9/1977 | Cuisia et al. | 210/58 |
| 4,306,991 | 12/1981 | Hwa et al. | 252/180 |
| 4,432,879 | 2/1984 | Greaves et al. | 210/699 |
| 4,446,028 | 5/1984 | Becker | 252/181 |
| 4,446,046 | 5/1984 | Becker | 210/697 |
| 4,499,002 | 2/1985 | Masler, III et al. | 252/180 |
| 4,518,745 | 5/1985 | Engelhardt et al. | 525/326.6 |
| 4,743,666 | 5/1988 | Engelhardt et al. | 526/240 |
| 4,759,851 | 7/1988 | Chen | 210/697 |
| 4,849,129 | 7/1989 | Chen et al. | 252/181 |
| 4,863,614 | 9/1989 | Chen et al. | 210/699 |
| 4,885,097 | 12/1989 | Amjad et al. | 210/701 |

FOREIGN PATENT DOCUMENTS 0218351 4/1987 European Pat. Off. .

OTHER PUBLICATIONS

Losungsverhalten und thermische Eigenschaften von Styrencopolymeren ungesattigter Phosphonsauren-M. Hartmann et al. (translation).

Synthese von Styrencopolymeren ungesattigter Phosphonsauren und Phosphonsaureester-M. Hartmann et al. (translation).

*Primary Examiner*—Ivars Cintins
*Attorney, Agent, or Firm*—James P. Barr

[57] ABSTRACT

This invention relates to a method of inhibiting scale formation in aqueous systems wherein allylphosphonate copolymers are added to the system in an amount effective to inhibit scale formation. The allylphosphonate copolymers of this invention exhibit characteristic properties for the treatment of aqueous systems, namely strong calcium complexation, excellent iron dispersion, inhibition of calcium carbonate scale and inhibition of calcium phosphate deposition.

19 Claims, No Drawings

METHOD OF INHIBITING SCALE DEPOSITS

FIELD OF THE INVENTION

1. Field of the Invention

This invention relates to scale inhibition in aqueous systems, and more specifically to the use of novel allylphosphonate copolymers to treat aqueous systems.

2. Description of the Prior Art

Recent research has been directed to the development of organic water treatment agents for use in scale or corrosion control in aqueous systems. Among the organic agents successfully employed for water treatment are numerous organic phosphonates. These compounds may generally be employed without detrimentally interfering with other commercial water treatment additives. Phosphonic acid compounds have also been used in other fields for such purposes as flame retardants, plasticizers, lubricants and surfactants.

U.S. Pat. Nos. 4,849,129 and 4,863,614 to Chen et al disclose new water soluble allyl alkylene phosphonate copolymers and terpolymers and methods of use for water treatment. The water soluble copolymers and terpolymers disclosed therein comprise repeat units having the structure

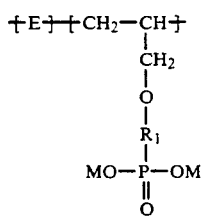

wherein E is the repeat unit after polymerization of an α, β ethylenically unsaturated compound, $R_1$ is a hydroxy substituted or non-substituted lower alkylene group, M is hydrogen, a water soluble cation or a non-substituted lower alkyl group.

M. Hartman et al. "Solution Behavior and Thermal Properties of Styrene Copolymer of Unsaturated Phosphonic Acids", Acta Polymerica 31, 700–703 (1980) disclose the solution behavior and thermal and mechanical behavior of styrene copolymers of unsaturated phosphonic acids and their ethyl esters. As expected, the solubility of these copolymers is determined by the position of the phosphonic acid group on the polymer chain. M. Hartman et al "Synthesis of Styrene Copolymers with Unsaturated Phosphonic Acids and Phosphonic Acid Esters", Acta Polymerica 31, 165–168 (1980) disclose a method of preparing styrene copolymers of unsaturated phosphonic acids wherein esters of vinyl phosphonic acid, allyl phosphonic acid, 4-vinyl benzene phosphonic acid and 2-(4-vinyl-phenyl) ethane phosphonic acid are first copolymerized with styrene and then subsequently hydrolyzed. These polymers may be used as ion exchange resins, flame retardants, coating materials for metal corrosion inhibition, and in improving the coloring of textile fibers. This reference discloses that neither phosphonylation of polymers nor copolymerization of unsaturated free phosphonic acids proved to be very suitable for the synthesis of soluble, phosphonic acid containing styrene copolymers with a defined structure.

SUMMARY OF THE INVENTION

It is an object of this invention to provide a method of inhibiting the formation of scale in aqueous systems.

It is another object of this invention to provide a method of scale inhibition wherein novel, water soluble allyl phosphonate copolymers are added to an aqueous system in an amount effective to control scale formation therein.

In accordance with the present invention, there has been provided a method of inhibiting the deposition of precipitates in aqueous systems by adding to the system an effective amount of a water soluble allylphosphonate copolymer derived from one or more allyl phosphonate monomers having the formula:

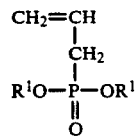

and one or more water soluble, α, β ethylenically unsaturated, non-phosphorus containing monomers having the formula:

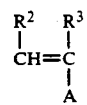

wherein $R^1$ is independently selected from the group consisting of hydrogen, lower alkyl groups having from 1 to about 4 carbon atoms and salt forming cations, $R^2$ and $R^3$ are independently selected from the group consisting of hydrogen, halogen, COOH, $CH_2COOH$, lower alkyl groups having from 1 to about 4 carbon atoms, and phenyl, and A is selected from the group consisting of COOH, $CH_2COOH$, $\phi COOH$, $SO_3H$, $CH_2SO_3H$, $CH(CH_3)SO_3H$, $CH_2OCH_2CH(OH)CH_2SO_3H$, $\phi\text{-}SO_3H$,

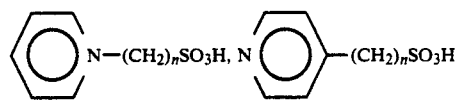

wherein n=2 to 4, $CONH_2$, $CONHCH_3$, $CON(CH_3)_2$, $CONHCH_2OH$, $CONHCH(OH)COOH$, $CONHC(CH_3)_2CH_2SO_3H$, $COO(CH_2)_nSO_3H$ wherein n=2 to 4, and $CO(OCH_2CH_2)_nOH$ wherein n=1 or more, water soluble salts of sulfonate and carboxylate groups in an amount effective to inhibit the formation of scale.

DETAILED DESCRIPTION

The present invention is directed to a method for treating aqueous systems to inhibit the formation of deposits therein. Specifically, the method involves adding to the aqueous system, an effective amount of a water-soluble allylphosphonate polymer to inhibit the precipitation of deposits such as for example scale deposits, iron oxide deposits, and the like. Suitable water-soluble allylphosphonate polymers for use in this invention are derived from one or more allylphosphonate monomers having the formula:

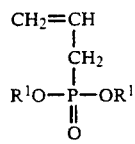

wherein $R^1$ is either hydrogen, a lower alkyl group having from 1 to 4 carbon atoms, or salt forming cations; and one or more water-soluble α, β-ethylenically unsaturated, non-phosphorus containing monomers having the formula:

wherein $R^2$ and $R^3$ are independently selected from the group consisting of hydrogen, halogen, COOH, $CH_2COOH$, lower alkyl groups having from 1 to about 4 carbon atoms, and phenyl, and A is selected from the group consisting of COOH, $CH_2COOH$, $\phi COOH$, $SO_3H$, $CH_2SO_3H$, $CH(CH_3)SO_3H$, $CH_2OCH_2CH(OH)CH_2SO_3H$,

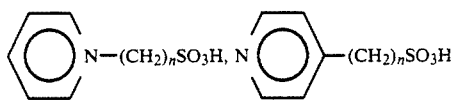

wherein n=2 to 4, $CONH_2$, $CONHCH_3$, $CON(CH_3)_2$, $CONHCH_2OH$, $CONHCH(OH)COOH$, $CONHC(CH_3)_2CH_2SO_3H$, $COO(CH_2)_nSO_3H$ wherein n=2 to 4, and $CO(OCH_2CH_2)_nOH$ wherein n=1 or more, water soluble salts of sulfonate and carboxylate groups.

The average molecular weight of these copolymers, based on a weight average, is generally between about 500 and one million, preferably between about 1000 and 500,000, although polymers having molecular weights below 500 and above one million may also be used with some success. The most preferred average molecular weight for polymers used for water treatment is at least about 800–1000 and do not generally exceed 100,000.

In a preferred embodiment, the water-soluble allylphosphonate copolymer is derived from one or more allyl phosphonic acid monomers having the above formula wherein $R^1$ is hydrogen, $CH_2CH_3$ or a mixture of monomers having hydrogen and $CH_2CH_3$, and one or more water-soluble, α, β-ethylenically unsaturated, non-phosphorus containing monomers having the above formula wherein $R^2$ is hydrogen or COOH, $R^3$ is hydrogen or $CH_3$ and A is COOH, $CH_2COOH$, $CH_2SO_3H$, $\phi SO_3H$, $CONHC(CH_3)_2CH_2SO_3H$, $CH_2OCH_2CH(OH)CH_2SO_3H$, or a mixture of monomers having the above substituted groups.

Another preferred allylphosphonate copolymer is derived from mixtures of monomers which include the following: $R^1$ is hydrogen, $CH_2CH_3$ or mixtures thereof, together with a first comonomer wherein $R^2$ is COOH, $R^3$ is hydrogen, A is COOH, and a second comonomer wherein $R^2$ is hydrogen, $R^3$ is hydrogen and A is $CH_2SO_3H$, $\phi SO_3H$, $CONHC(CH_3)_2CH_2SO_3H$ or mixtures thereof.

Another preferred allylphosphonate copolymer derived from mixtures of monomers include the following: $R^1$ is hydrogen, $CH_2CH_3$ or mixtures thereof, together with a first comonomer wherein $R^2$ is hydrogen, $R^3$ is hydrogen, $CH_3$ or mixtures thereof, A is COOH, and a second comonomer wherein $R^2$ is hydrogen, $R^3$ is hydrogen and A is $CH_2SO_3H$, $\phi SO_3H$, $CONHC(CH_3)_2CH_2SO_3H$ and mixtures thereof.

The allylphosphonate copolymers of this invention comprise repeat units as represented by the generalized formula:

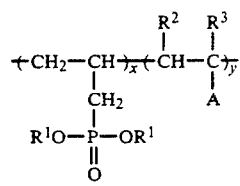

wherein $R^1$, $R^2$, $R^3$ and A are as above defined, and the molar percentage of x in the copolymer is from 1 to 90 percent and the molar percentage of y in the copolymer is from 10 to 99 percent, and the total of x and y equals 100 percent. When both $R^1$ groups are $C_1$ to $C_4$ alkyl, it is preferred that the molar percentage of x in the copolymer be between 1 to 50 percent due to solubility considerations.

The copolymers of this invention should be added to the aqueous system, for which deposit inhibition is desired, in an amount effective to control the deposition of precipitates. This amount will vary depending upon the particular system being treated, and is dependent upon such factors as pH, temperature, water quality, and the concentration of the deposit forming species in the water. Typical deposit forming species found in aqueous systems include, but are not limited to calcium phosphate, calcium carbonate, magnesium phosphate, zinc phosphate, calcium silicate, magnesium silicate, magnesium hydroxide, zinc hydroxide, iron oxide, and the like. Typically, the copolymers may be added at a concentration level of about 0.1 ppm to 1000 ppm preferably between about 1.0 ppm to 100 ppm, most preferably 2 ppm to 50 ppm. The copolymers may be added directly into the aqueous systems or may be prediluted prior to addition. The copolymers may also be used in combination with other known water treatment additives such as chelants, corrosion inhibitors, oxygen scavengers, pH regulating agents, dispersants, biocides, and other scale inhibitors, and mixtures thereof. Example of chelants are N,N,N',N' ethylenediamine tetracetic acid and N,N'-bis(2-hydroxylbenzyl) ethylene dinitrilo-N,N'-diacetic acid. Examples of pH regulating agents include mineral acids, organic acids, bases and various buffers. Examples of other scale inhibitors include phosphonates such as aminotrimethylphosphonic acid; 1-hydroxyethylidene-1,1-diphosphonic acid and 2-phosphonobutane-1,2,4-tricarboxylic acid, as well as polyacrylates and polyacrylamides. Examples of dispersants include carboxylate and sulfonate containing polymers. Examples of biocides are chlorine and bromine-containing materials and quaternary ammonium salts. Examples of corrosion inhibitors include phosphates, organophosphonates, chromates, molybdate, azoles, and zinc.

The aqueous systems capable of being treated with the copolymers of this invention include, but are not limited to cooling water systems such as, e.g. cooling towers, as well as to desalinization units, gas scrubbers, boiler systems and the like.

The following examples are provided to illustrate the invention in accordance with the principles of this invention, but are not to be construed as limiting the invention in any way except as indicated in the appended claims. All parts and percentages are by weight unless otherwise indicated.

EXAMPLE 1

One method of evaluating activity of a material for treating aqueous systems consists of measuring its ability to chelate with cations which are normally found in such systems. The following calcium complexation test was undertaken for this evaluation. A standard calcium ion solution (100 ppm as $CaCO_3$) was prepared by diluting standard calcium ion solution to pH=10.0 with $NH_4OH$ and ionic strength of 0.078M with KCl. A calcium ion selective electrode was immersed into 250 ml of this solution and the potential was adjusted to 0 mV according to a calibration curve of calcium ion concentration versus potential. A 5000 ppm polymer solution was separately prepared and adjusted to pH=10.0 with $NH_4OH$. This treatment solution was then added to the calcium solution in small increments and the potential at equilibrium was recorded. The percent of complexed calcium was calculated from the calibration curve. A more negative value in potential implies a lower concentration of free calcium ion remained in the solution and hence a stronger interaction between polymer and calcium. Table I shows the results obtained when 50 ml of the treatment solution was added.

It is clear from Table I that an incorporation of allylphosphonate moieties onto a polymer markedly increased its chelating ability toward calcium ion.

TABLE I

| Polymer[1] | Molar Ratio | Mol. Wt. | Potential (mV) |
|---|---|---|---|
| P(AA) | 100 | 2,400 | −50 |
| P(MAA) | 100 | 4,200 | −26 |
| P(MA) | 100 | 500 | −39 |
| P(MAA-SSS) | 80-20 | 14,300 | −29 |
| P(APA-EAPA-MAA) | 11-6-83 | 27,300 | −46 |
| P(APA-EAPA-MAA-SSS) | 6-3-72-19 | 44,000 | −36 |
| P(APA-EAPA-FuA) | 27-6-67 | 8,000 | −82 |
| P(APA-EAPA-FuA) | 31-13-56 | 10,200 | −97 |
| P(APA-EAPA-FuA) | 35-12-53 | 13,000 | −100 |
| P(APA-EAPA-ItA) | 25-9-66 | 10,700 | −99 |
| P(APA-EAPA-AA-FuA) | 7-3-78-12 | 30,500 | −86 |

TABLE I-continued

| Polymer[1] | Molar Ratio | Mol. Wt. | Potential (mV) |
|---|---|---|---|
| P(APA-EAPA-MAA-FuA) | 27-6-53-14 | 13,900 | −76 |
| P(APA-EAPA-AA-SVS) | 20-4-59-17 | 137,000 | −62 |
| P(APA-EAPA-FuA-SAS) | 15-5-72-8 | 7,900 | −74 |
| P(APA-EAPA-FuA-SAS) | 17-6-70-7 | 7,500 | −84 |
| P(APA-EAPA-FuA-HAPS) | 15-7-52-26 | 6,000 | −65 |
| P(APA-EAPA-FuA-SSS) | 8-2-52-38 | 24,800 | −76 |
| P(APA-EAPA-FuA-SSS) | 14-3-55-28 | 10,800 | −86 |

[1]AA: acrylic acid
MAA: methacrylic acid
MA: maleic acid
SSS: sodium styrenesulfonate
ItA: itaconic acid
FuA: fumaric acid
SVS: sodium vinylsulfonate
SAS: sodium allylsulfonate
HAPS: 2-hydroxy-3-allyloxy-1-propanesulfonic acid

EXAMPLE 2

This example demonstrates the effectiveness of various phosphonate polymers as a threshold inhibitor of calcium carbonate scale in the absence or presence of 1-hydroxyethylidene-1,1-diphosphonic acid (HEDPA). The following test procedure was undertaken for this evaluation. Samples were prepared in varying concentrations of polymers as indicated in Table II and were added to a test solution containing 1000 ppm calcium and 1200 ppm bicarbonate when expressed as calcium carbonate. The pH of the solution was adjusted to 8.55 and was then oscillated for 18 hours at 50° C. The solution was allowed to cool to room temperature, and a 20 ml aliquot was withdrawn and filtered through a 0.1 μm Millipore membrane. The filtrate was then acidified to pH≈3 with diluted nitric acid. The amount of calcium remaining in solution was determined by inductively coupled plasma atomic emission spectroscopy (ICP AES). The % threshold inhibition was calculated as follows:

$$\% \text{ Inhibition} = \frac{\text{ppm Ca}^{++}(\text{treated}) - \text{ppm Ca}^{++}(\text{control})}{\text{ppm Ca}^{++}(\text{initial}) - \text{ppm Ca}^{++}(\text{control})} \times 100$$

The results are summarized in Table II.

The data in Table II demonstrate that these phosphonate polymers are effective threshold inhibitors of calcium carbonate scale and clearly are synergized by a small amount of HEDPA.

TABLE II

| Polymer[1] | Molar Ratio | Mol. Wt. | % Inhibition HEDPA/Polymer Dosage (ppm/ppm) | | | |
|---|---|---|---|---|---|---|
| | | | 0/5 | 0/10 | 0.26/5.0[2] | 0.5/5.0[3] |
| P(AA) | 100 | 2400 | | 57 | 65 | 69 |
| P(AA) | 100 | 5000 | | 45 | 61 | 63 |
| P(MAA) | 100 | 4200 | | 22 | 27 | 47 |
| P(MAA-AMPS) | 50-50 | 22000 | | 19 | 21 | 18 |
| P(APA-EAPA-SAS) | 35-10-55 | 1900 | 24 | 43 | 78 | 84 |
| P(APA-EAPA-SAS) | 25-7-68 | 2100 | | 47 | 58 | 63 |
| P(APA-EAPA-HAPS) | 30-12-58 | 1600 | 32 | 62 | 67 | 82 |
| P(APA-EAPA-HAPS) | 38-12-50 | 1400 | | | 56 | 59 |
| P(APA-EAPA-FuA-AS).Na | 17-6-70-7 | 7500 | 34 | 57 | 65 | 69 |
| P(APA-EAPA-FuA-AS).Na | 15-5-72-8 | 7900 | | 43 | 93 | 59 |
| P(APA-EAPA-FuA-HAPS).Na | 15-7-52-26 | 6000 | 52 | 43 | 67 | 66 |

TABLE II-continued

| Polymer[1] | Molar Ratio | Mol. Wt. | % Inhibition HEDPA/ Polymer Dosage (ppm/ppm) | | | |
|---|---|---|---|---|---|---|
| | | | 0/5 | 0/10 | 0.26/5.0[2] | 0.5/5.0[3] |
| P(APA-EAPA-FuA-HAPS).Na | 17-7-44-32 | 7800 | | 43 | 58 | 59 |

[1]AA: acrylic acid
MAA: methacrylic acid
AMPS: 2-acrylamido-2-methyl-1-propanesulfonic acid
APA: allylphosphonic acid
EAPA: ethyl allylphosphonate
FuA: fumaric acid
SAS: sodium allylsulfonate
HAPS: 2-hydroxy-3-allyloxy-1-propanesulfonic acid
[2]0.26 ppm HEDPA showed 2% inhibition
[3]0.50 ppm HEDPA showed 44% inhibition.

EXAMPLE 3

This example indicated the effect of pH on the threshold inhibition behavior of phosphonate polymers as compared to other polymers. The test was performed according to the procedure described in Example 2, except that the tested water contained 1000 ppm calcium and 655 ppm bicarbonate (as calcium carbonate). A polymer dosage of 10 ppm was used in all cases and the results of the test are set forth in Table III.

TABLE III

| Polymer | Mol. Wt. | % Inhibition at pH | | |
|---|---|---|---|---|
| | | 8.40 | 8.55 | 8.70 |
| P(MAA) | 4200 | 23 | 27 | 18 |
| P(MAA-AMPS) | 22000 | 27 | 24 | 17 |
| P(APA-EAPA-SAS) | 1900 | 78 | 75 | 84 |
| P(APA-EAPA-HAPS) | 1600 | 72 | 62 | 69 |

The data in Table III demonstrate that the phosphonate polymers are effective threshold inhibitors an the % inhibition is nearly not affected by the pH of water.

EXAMPLE 4

In order to demonstrate the effectiveness of the phosphonate polymers in dispersing particulate matter, the following test procedure was undertaken. A 500 ml solution was made up with 450 ml deionized distilled water already adjusted to pH $\approx$ 11 with NaOH, 10 ml of 1208 ppm $FeCl_3.6H_2O$, a desired amount of polymer, 10 ml of 3098 ppm $NaHCO_3$, 10 ml of 1183 ppm $Na_2SiO_3.9H_2O$, 10 ml of 1233 ppm $MgSO_4.7H_2O$ and 10 ml of 2205 ppm $CaCl_2.2H_2O$. The pH was readjusted to 11.0 with NaOH. This solution was heated to reflux vigorously for 3 hours. Thereafter, the solution was transferred into a graduated cylinder while hot and was allowed to settle for 23 hours at room temperature. An aliquot was then withdrawn from the cylinder at specific depth and acidified to pH $\approx$ 3. The remaining iron in the solution was analyzed by inductively coupled plasma atomic emission spectroscopy. The % dispersion was calculated as follows:

$$\% \text{ dispersion} = \frac{\text{ppm Fe (treated)} - \text{ppm Fe (control)}}{\text{ppm Fe (initial)} - \text{ppm Fe (control)}} \times 100$$

The results are shown in Table IV.

TABLE IV

| Polymer[1] (6 ppm) | Molar Ratio | Mol. Wt. | % Dispersion |
|---|---|---|---|
| P(MAA) | 100 | 4,200 | 33 |
| P(AA-AAm) | 75-25 | 20,000 | 36 |
| P(MA-AS) | 50-50 | 2,300 | 9 |
| P(MA-SS) | 25-75 | 3,000 | 47 |
| P(APA-EAPA-AAm) | 17-6-77 | 27,000 | 88 |
| P(APA-EAPA-FuA) | 35-12-53 | 13,000 | 70 |
| P(APA-EAPA-AMPS) | 14-5-81 | 20,900 | 71 |
| P(APA-EAPA-AA-SVS) | 20-4-59-17 | 137,000 | 88 |
| P(APA-EAPA-AA-SAS) | 7-1-86-6 | 8,900 | 24 |
| P(APA-EAPA-AA-SSS) | 10-5-38-47 | 63,000 | 85 |
| P(APA-EAPA-MAA-SVS) | 8-3-76-13 | 201,000 | 52 |
| P(APA-EAPA-MAA-AMPS) | 11-3-46-40 | 193,000 | 75 |
| P(APA-EAPA-MAA-SSS) | 6-3-72-19 | 44,000 | 77 |
| P(APA-EAPA-FuA-SAS) | 17-6-70-7 | 7,500 | 70 |
| P(APA-EAPA-FuA-HAPS) | 15-7-52-26 | 6,000 | 29 |
| P(APA-EAPA-FuA-SSS) | 8-2-52-38 | 24,800 | 73 |

[1]AAm: acrylamide
AS: allylsulfonic acid
SS: styrenesulfonic acid
See footnote on Table I for other abbreviations.

EXAMPLE 5

This example demonstrates the effectiveness of the phosphonate polymers as calcium phosphate scale inhibitors. The following test procedure was undertaken for this evaluation. A known volume of calcium chloride solution was added to a 400-ml beaker to give a final calcium ion concentration of 400 ppm $Ca^{2+}$ as $CaCO_3$. To this solution, known volumes of polymer solution and boric acid were added to give a final concentration of polymer in the ranges of 5-24 ppm, and with 0.005M borate buffer. The mixed solution was maintained at 60° C. and the pH was adjusted to 8.30 by addition of NaOH. A known volume of phosphate salt, such as $Na_2HPO_4$, was slowly added to the continuously stirred solution containing calcium and polymer, to give a final concentration of 20 ppm of orthophosphate ions. The solution sample was transferred into a graduated cylinder and was allowed to settle for 24 hours at room temperature. An aliquot was then withdrawn from the cylinder at a specific depth and filtered through a 0.2 micron filter membrane. The suspended orthophosphate ions were analyzed using the ascorbic acid method from Hach Co. The instrument used for the colorimetric measurements was a Milton Roy Spectronic 21. The percent of inhibition was calculated as follows:

$$\% \text{ Inhibition} = \frac{(PO_4) \text{ treated} - (PO_4) \text{ control}}{(PO_4) \text{ initial} - (PO_4) \text{ control}} \times 100$$

The results are shown in Table V.

TABLE V

| Polymer[1] | Molar Ratio | % Inhibition at Polymer Dosage of | |
|---|---|---|---|
| | | 8 ppm | 16 ppm |
| P(MAA) | 100 | 24 | 27 |
| P(AA) | 100 | 20 | 32 |
| P(MA-AS) | 50-50 | 19 | 26 |
| P(APA-EAPA-AGA) | 29-10-61 | 37 | 75 |
| P(APA-EAPA-FuA-SSS) | 8-2-52-38 | 33 | 89 |
| P(APA-EAPA-MAA-SSS) | 8-3-43-46 | 80 | 93 |
| P(APA-EAPA-MAA-SSS) | 7-3-58-32 | 69 | 83 |
| P(APA-MAA-SSS) | 10-66-24 | 43 | 73 |
| P(APA-EAPA-MAA-AMPS) | 11-3-46-40 | 54 | 84 |
| P(APA-EAPA-AA-SSS) | 10-5-38-47 | 77 | 84 |

[1]AGA: acrylamidoglycolic acid. See footnote on Table I for other abbreviations.

We claim:

1. A method for inhibiting deposits in aqueous systems comprising adding to the system, in an amount effective to inhibit the deposition of precipitates, a water-soluble allylphosphonate copolymer consisting essentially of one or more allylphosphonate monomers having the formula:

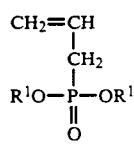

and one or more water-soluble, α, β-ethylenically unsaturated, non-phosphorus containing monomers having the formula:

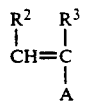

wherein $R^1$ is independently selected from the group consisting of hydrogen, lower alkyl groups having from 1 to about 4 carbon atoms, and salt forming cations, $R^2$ and $R^3$ are independently selected from the group consisting of hydrogen, halogen, COOH, $CH_2COOH$, lower alkyl groups having from 1 to about 4 carbon atoms, and phenyl, and A is selected from the group consisting of $SO_3H$, $CH_2SO_3H$, $CH(CH_3)SO_3H$, $CH_2OCH_2CH(OH)CH_2SO_3H$, $\phi$-$SO_3H$,

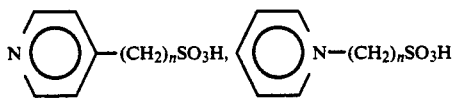

wherein n=2 to 4, $CONH_2$, $CONHCH_3$, $CON(CH_3)_2$, $CONHCH_2OH$, $CONHCH(OH)COOH$, $CONHC(CH_3)_2CH_2SO_3H$, $COO(CH_2)_nSO_3H$ wherein n=2 to 4, and $CO(OCH_2CH_2)_nOH$ wherein n=1 or more, water soluble salts of sulfonate and carboxylate groups.

2. A method according to claim 1 wherein the copolymer has a weight average molecular weight between about 500 to 1,000,000.

3. A method according to claim 1 wherein the copolymer is added to the aqueous systems at a concentration level of about 0.1 ppm to 1,000 ppm.

4. A method according to claim 3 wherein the copolymer is added to the aqueous system at a concentration level of about 1.0 to 100 ppm.

5. A method according to claim 4 wherein the copolymer is added to the aqueous system at a concentration level of about 2 to 50 ppm.

6. A method according to claim 1 wherein the copolymer inhibits calcium carbonate scale, calcium phosphate scale, calcium sulfate scale and mixtures thereof.

7. A method according to claim 1 wherein the copolymer inhibits the deposition of precipitates selected from the group consisting of calcium phosphate, calcium carbonate, calcium sulfate, magnesium phosphate, magnesium sulfate, zinc phosphate, zinc sulfate, calcium silicate, magnesium silicate, magnesium hydroxide, zinc hydroxide, iron oxide and mixtures thereof.

8. A method according to claim 1 wherein the copolymer is used in combination with a phosphonate.

9. A method according to claim 8 wherein the phosphonate is selected from the group consisting of 1-hydroxyethylidene-1,1-diphosphonic acid, aminotrimethylphosphonic acid, 2-phosphonobutane-1,2,4-tricarboxylic acid and mixtures thereof.

10. A method according to claim 1 wherein the aqueous system is a cooling water system, a recirculating water system, a boiler water system, a desalinization water unit, or a gas scrubber.

11. A method according to claim 1 wherein $R^1$ is hydrogen, $CH_2CH_3$ or mixtures thereof.

12. A method according to claim 1 wherein $R^2$ is hydrogen or COOH, $R^3$ is hydrogen or $CH_3$ and A is $CH_2SO_3H$, $\phi SO_3H$, $CONHC(CH_3)_2CH_2SO_3H$ or $CH_2OCH_2CH(OH)CH_2SO_3H$.

13. A method according to claim 1 wherein the copolymer is derived from a mixture of monomers which include the following: $R^1$ is hydrogen, $CH_2CH_3$ or mixtures thereof, a first water-soluble, α, β-ethylenically unsaturated, non-phosphorus containing monomer wherein $R^2$ is COOH, $R^3$ is hydrogen and a second water soluble, α, β-ethylenically unsaturated, non-phosphorus containing monomer wherein $R^2$ is hydrogen, $R^3$ is hydrogen and A is $CH_2SO_3H$, $\phi SO_3H$, $CONHC(CH_3)_2CH_2SO_3H$ or mixtures thereof.

14. A method according to claim 1 wherein $R^1$ is hydrogen, $CH_2CH_3$ or mixtures thereof, a first water-soluble, α, β-ethylenically unsaturated, non-phosphorus containing monomer wherein $R^2$ is hydrogen, $R^3$ is hydrogen, $CH_3$ or mixtures thereof, and a second water-soluble α, β-ethylenically unsaturated non-phosphorus containing monomer wherein $R^2$ is hydrogen, $R^3$ is hydrogen, and A is $CH_2SO_3H$, $\phi SO_3H$, $CONHC(CH_3)_2CH_2SO_3H$ or mixtures thereof.

15. A method according to claim 1 wherein the copolymer is used in combination with chelants, corrosion inhibitors, oxygen scavengers, pH regulating agents, dispersants, biocides, other deposit inhibitors, or mixtures thereof.

16. A method according to claim 15 wherein the chelant is N,N,N',N' ethylenediamine tetraacetic acid or N,N'-bis(2-hydroxylbenzyl)ethylene dinitrilo-N,N'-diacetic acid.

17. A method according to claim 15 wherein the pH regulator is selected from the group consisting of mineral acids, organic acids, bases and buffers.

18. A method according to claim 15 wherein the other deposit inhibitor is a polyacrylate or a polyacrylamide.

19. A method for inhibiting deposits in aqueous systems comprising adding to the system, in an amount effective to inhibit the deposition of precipitates, a water-soluble allylphosphonate copolymer consisting essentially of one or more allylphosphonate monomers having the formula:

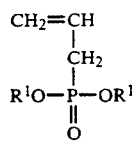

and one or more, of a first water-soluble, $\alpha, \beta$-ethylenically unsaturated, non-phosphorus containing monomers having the formula:

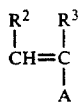

wherein $R^1$ is independently selected from the group consisting of hydrogen, lower alkyl groups having from 1 to about 4 carbon atoms, and salt forming cations, $R^2$ and $R^3$ are independently selected from the group consisting of hydrogen, halogen, COOH, $CH_2COOH$, lower alkyl groups having from 1 to about 4 carbon atoms, and phenyl, and A is selected from the group consisting of $SO_3H$, $CH_2SO_3H$, $CH(CH_3)So_3H$, $CH_2OCH_2CH(OH)CH_2SO_3H$, $\phi\text{-}SO_3H$,

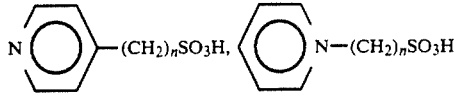

wherein n=2 to 4, $COHN_2$, $CONHCH_3$, $CON(CH_3)_2$, $CONHCH_2OH$, $CONHCH(OH)COOH$, $CONHC(CH_3)_2CH_2SO_3H$, $COO(CH_2)_nSO_3H$ wherein n=2 to 4, and $CO(OCH_2CH_2)_nOH$ wherein n=1 or more, water soluble salts of sulfonate groups, and one or more of a second $\alpha, \beta$-ethylenically unsaturated, non-phosphorus containing monomer having the above formula except wherein A is selected from the group consisting of COOH, $CH_2COOH$, and $\phi COOH$, and water soluble salts of carboxylate groups.

* * * * *